A. BULLEY.
TRACE COUPLING.
APPLICATION FILED JAN. 31, 1910.
979,743.
Patented Dec. 27, 1910.
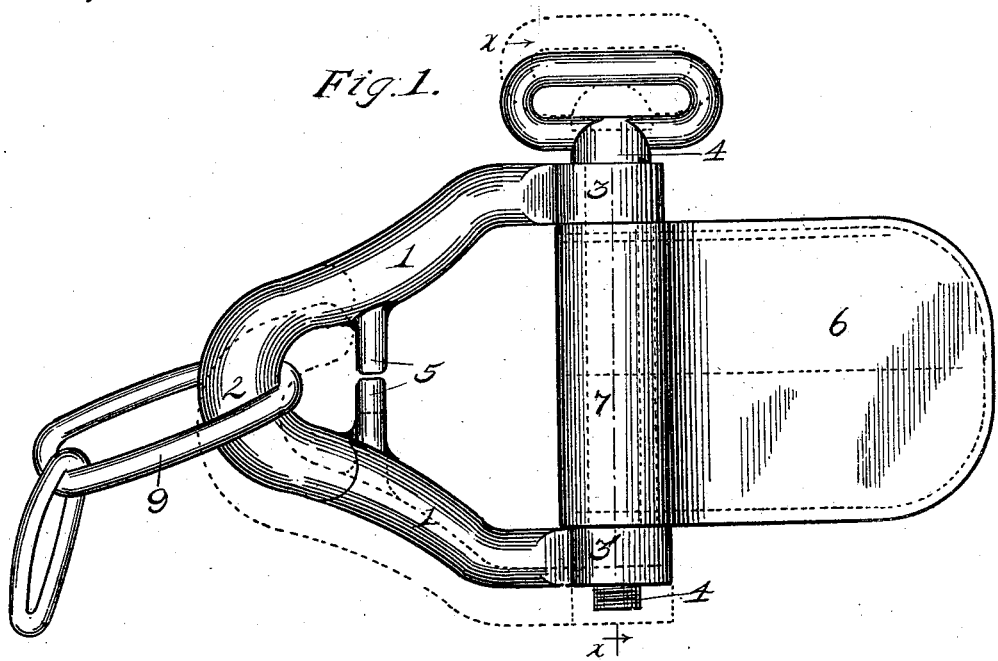
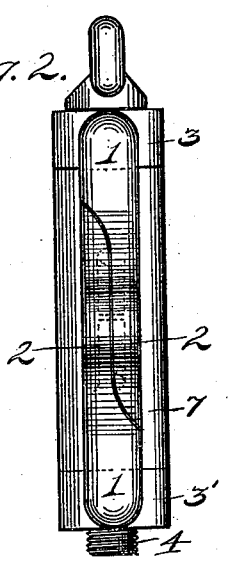
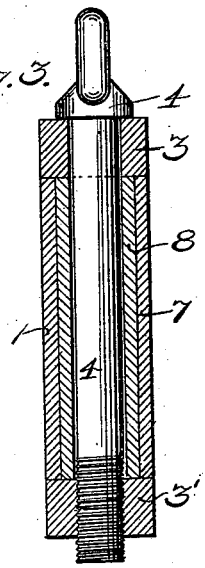
Witnesses:
C. E. Wessels.
B. T. Richards.
Inventor:
Albert Bulley
By Joshua R. H. Potts
his Attorney.

UNITED STATES PATENT OFFICE.

ALBERT BULLEY, OF MELLEN, WISCONSIN, ASSIGNOR OF TWO-THIRDS TO JOHN BLAKE AND WILLIAM LAYMAN, BOTH OF MELLEN, WISCONSIN.

TRACE-COUPLING.

979,743.

Specification of Letters Patent.  Patented Dec. 27, 1910.

Application filed January 31, 1910. Serial No. 541,082.

*To all whom it may concern:*

Be it known that I, ALBERT BULLEY, a citizen of the United States, residing at Mellen, county of Ashland, and State of Wisconsin, have invented certain new and useful Improvements in Trace-Couplings, of which the following is a specification.

My invention relates to improvements in trace couplings and has for its object the production of a trace coupling of improved construction and efficient in its operation.

The invention consists in the combination and arrangement of parts hereinafter described and claimed.

The invention will be best understood by reference to the accompanying drawings forming a part of this specification, and in which, Figure 1 is a top plan view of a coupling embodying my invention, Fig. 2, an end view of the coupling, and Fig. 3, a sectional view on line $x$—$x$ of Fig. 1.

The preferred form of construction as illustrated in the drawings comprises two side members 1 provided at their outer ends with over-lapping hooks 2 and at their inner ends with perforated eyes 3 and 3'. A bolt 4 passing freely through eye 3 and threaded in eye 3' serves to pivotally secure the members 1 together and to permit lateral movements thereof toward or away from each other. Near their outer ends members 1 are provided with inwardly projecting alining locking members 5 adapted to closely approach each other when the said members are secured in coupling position.

The coupling is fastened to a whiffletree or other desired part by means of a securing strap 6 provided at its free end with a loop 7 inclosing a metallic sleeve 8 adapted to rest between eyes 3 and 3' and receive bolt 4, as shown.

In use, the end link 9 of a trace is secured in the coupling by loosening bolt 4 and swinging members 1 apart on their pivot; then the link 9 may be passed over one of the members 1 and its corresponding projection 5. The over-lapping ends 2 are then swung together when link 9 is passed between projections 5 so as to encompass hooked ends 2. Then bolt 4 is tightened until members 1 are secured against lateral separation, in which position projections 5 closely approach each other, as shown in Fig. 1. In this position it will be observed that the link 9 will prevent the over-lapping ends 2 from swinging apart and that projections 5 will prevent link 9 from becoming disengaged with either of the over-lapping ends 2. Thus the coupling will be securely held in locking position.

While I have illustrated and described the preferred construction for carrying my invention into effect, this is capable of variation and modification without departing from the spirit of my invention. I therefore do not wish to be limited to the exact details of construction set forth but desire to avail myself of such variations and modifications as come within the scope of the appended claims.

Having described my invention what I claim as new and desire to secure by Letters Patent is:

1. A device of the class described, comprising two side members having their outer ends over-lapping and their inner ends provided with bolt receiving eyes, one of said eyes being threaded; alining locking projections near the ends of said members; and a locking bolt passing through one of said eyes and threaded in the other, substantially as described.

2. A device of the class described, comprising two side members having their outer ends over-lapping and their inner ends provided with bolt receiving eyes, one of said eyes being threaded; alining locking projections near the ends of said members, a securing strap provided with a loop at its free end; a metallic sleeve in said loop adapted to rest between said eyes; and a locking bolt passing through one of said eyes and said sleeve and threaded in the other eye, substantially as described.

In testimony whereof I have signed my name to this specification in the presence of two subscribing witnesses.

ALBERT BULLEY.

Witnesses:
D. E. BOWE,
C. F. PETERSON.